(12) United States Patent
Bowers et al.

(10) Patent No.: US 10,282,503 B2
(45) Date of Patent: May 7, 2019

(54) MITIGATING LENGTH-OF-DIFFUSION EFFECT FOR LOGIC CELLS AND PLACEMENT THEREOF

(71) Applicant: QUALCOMM Incorporated, San Diego, CA (US)

(72) Inventors: Benjamin John Bowers, Cary, NC (US); Anthony Correale, Jr., Raleigh, NC (US); Tracey Della Rova, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/193,003

(22) Filed: Jun. 25, 2016

(65) Prior Publication Data

US 2017/0371994 A1 Dec. 28, 2017

(51) Int. Cl.
*G06F 17/50* (2006.01)
*H01L 27/02* (2006.01)
*H01L 27/092* (2006.01)

(52) U.S. Cl.
CPC ...... *G06F 17/5072* (2013.01); *G06F 17/5081* (2013.01); *H01L 27/0207* (2013.01); *H01L 27/0924* (2013.01); *G06F 2217/02* (2013.01)

(58) Field of Classification Search
USPC .................................................. 716/118–125
See application file for complete search history.

(56) References Cited

U.S. PATENT DOCUMENTS

| | | | |
|---|---|---|---|
| 7,895,548 B2 | 2/2011 | Lin et al. | |
| 8,321,828 B2 | 11/2012 | Chern | |
| 8,631,366 B2 | 1/2014 | Hou et al. | |
| 8,650,020 B1 | 2/2014 | Wu et al. | |
| 8,782,576 B1 | 7/2014 | Bowers et al. | |
| 2003/0023936 A1* | 1/2003 | McManus | G06F 17/5068 716/127 |
| 2009/0271753 A1* | 10/2009 | Quandt | G06F 17/5068 716/119 |
| 2014/0291731 A1* | 10/2014 | Becker | H01L 27/11807 257/206 |
| 2015/0268189 A1* | 9/2015 | Rigante | H01L 29/66795 257/253 |

OTHER PUBLICATIONS

International Search Report and Written Opinion—PCT/US2017/035934—ISA/EPO—dated Sep. 15, 2017.
Xi-Wei Lin et al., "Layout Proximity Effects and Modeling Alternatives for IC Designs", IEEE Design & Test of Computer, IEEE Service Center, Mar. 1, 2012, vol. 27, No. 2, p. 18-25, XP011305153, ISSN: 0740-7475.

* cited by examiner

*Primary Examiner* — Binh C Tat
(74) *Attorney, Agent, or Firm* — Muncy, Geissler, Olds & Lowe, P.C./Qualcomm

(57) ABSTRACT

Systems and methods relate to cell placement methodologies for improving length of diffusion of transistors. For example, a first transistor with a first diffusion node which is bounded by a first diffusion cut is identified in a transistor level layout. The first diffusion cut is replaced with a first floating gate, and a first filler cell with a first filler diffusion region is added to extend a length of diffusion of the first diffusion node. Increasing the length of diffusion leads to improving drive strength and performance of the first transistor.

30 Claims, 5 Drawing Sheets

MITIGATING LENGTH-OF-DIFFUSION EFFECT FOR LOGIC CELLS AND PLACEMENT THEREOF

FIELD OF DISCLOSURE

Disclosed aspects relate to logic cell libraries used in the design and manufacture of semiconductor devices. More specifically, exemplary aspects relate to mitigation of length-of-diffusion (LOD) effects in logic cells and placement thereof.

BACKGROUND

In transistor level layout (e.g., of a metal oxide semiconductor (MOS) transistor), a length of diffusion (LOD) refers to an amount by which a diffusion region between source and drain terminals of the transistor extends away from a gate terminal. An LOD effect refers to stress induced on the MOS transistor based on the LOD. In general, a smaller LOD causes greater stress or in other words, has a worse LOD effect, while increasing or improving the LOD can lead to performance improvements.

It is difficult to completely mitigate LOD effect on transistors in a transistor level layout using standard logic cells and placement techniques. Some techniques to mitigate the LOD effect focus on extending the diffusion region, where possible, with left and right diffusion edges configured to share common electrical junctions (e.g., power and ground connections). However, extending the diffusion region in this manner may hinder cell placement methodologies which attempt to place logic cells of equal or comparable physical footprints (also measured in terms of cell pitch or width of the diffusion layers) in a manner which results in logic cells being abutted or adjoined. Such abutment can enable sharing of diffusion edges between adjoining cells and potentially increase the effective LOD of adjoining cells. However, logic cell placement to improve diffusion edge sharing in this manner may not be feasible in some situations.

For example, considering Fin Field Effect Transistor (Finfet) technologies wherein a common gate terminal may be shared among multiple Fins (or source/drain terminals of multiple FET cells), Finfet logic libraries may include logic cells with different Fin counts. If the diffusion regions of some Fins can be extended as noted above, the logic libraries may include logic cells with non-uniform lengths of diffusion regions, which means that some Fins of adjoining cells may not be able to share their diffusion regions with neighboring cells. Further, a lateral width of diffusion (in a transverse direction to the length of diffusion) varies proportionally with the number of Fins of each logic cell in a logic cell layout. While conventional layout techniques may allow for abutment of logic cells with the same number of Fins or the same width, such techniques may not permit placement of two cells with different Fin counts in a manner which could have allowed for sharing diffusion regions.

Accordingly, there is a need for improved logic cells and placement methodologies thereof which avoid the aforementioned problems of conventional techniques while mitigating LOD effects.

SUMMARY

Exemplary aspects of the invention are directed to systems and method for logic cell placement, which improve length of diffusion of transistor.

For example, an exemplary method is directed to logic cell placement wherein the method includes identifying a first transistor with a first diffusion node which is bounded by a first diffusion cut, replacing the first diffusion cut with a first floating gate, and adding a first filler cell with a first filler diffusion region to extend a length of diffusion of the first diffusion node. Increasing the length of diffusion leads to improving drive strength and performance of the first transistor in some aspects. In some aspects, the first diffusion node is on a left side or a right side of the first transistor, and wherein extending the length of diffusion of the first diffusion node satisfies corresponding maximum length specifications for the left side (e.g., sa) or the right side (e.g., sb), respectively, of the first transistor. The first diffusion node and the first filler diffusion region are connected to a same potential (e.g., VDD or GND) and the first transistor and the first filler cell may have a same device channel length or same threshold voltage or implantation.

In some aspects, an apparatus is disclosed, wherein the apparatus comprises means for performing exemplary functions and cell placement methodologies. For example, the apparatus comprises means for identifying a first transistor with a first diffusion node which is bounded by a first diffusion cut, means for replacing the first diffusion cut with a first floating gate, and means for adding a first filler cell with a first filler diffusion region to extend a length of diffusion of the first diffusion node.

Some aspects are directed to an apparatus comprising an integrated circuit layout, wherein the integrated circuit layout comprises a first transistor with a first diffusion node which is bounded by a first floating gate, and a first filler cell comprising a filler diffusion region configured to abut the first floating gate and extend a length of diffusion of the first diffusion node.

In some aspects, non-transitory computer readable storage medium comprising code are disclosed, wherein, the code, when executed by a processor, causes the processor to perform a cell placement method, the non-transitory computer readable storage medium comprising code for identifying a first transistor with a first diffusion node which is bounded by a first diffusion cut, code for replacing the first diffusion cut with a first floating gate, and code for adding a first filler cell with a first filler diffusion region to extend a length of diffusion of the first diffusion node.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figures 1A, 1B:
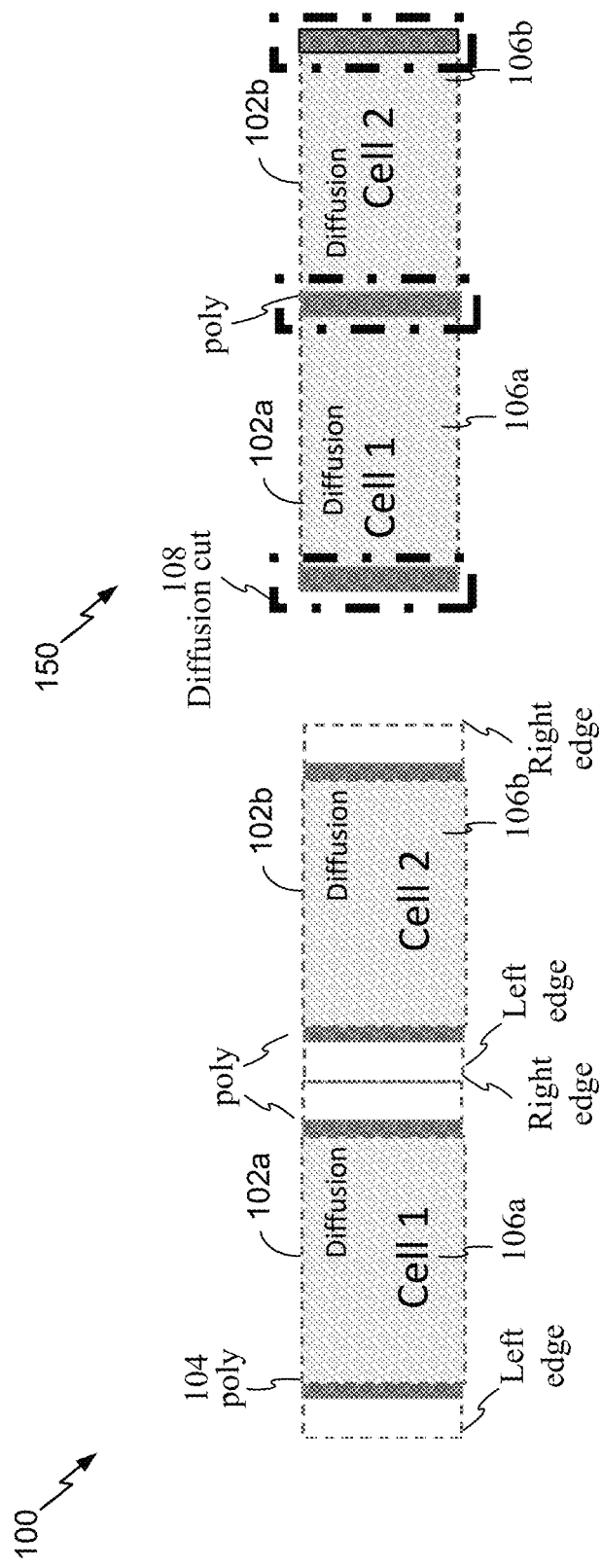
FIGS. 1A-B illustrate conventional transistor level layouts.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to logic cell layout and placement methodologies for increasing LOD. In some aspects, conventional diffusion cuts which terminate diffusion regions are replaced by techniques such as floating gates for extending underlying diffusion areas. Filler cells or filler diffusion regions are also used for extending diffusion areas of the same potential. Various techniques are also disclosed for placement and abutment of circuits with different Fin counts, as well as different channel lengths, implantation (or correspondingly threshold voltage characteristics), etc. Furthermore, appropriate selection of particular cells (including mirror flips of available cells in a library) based on aspects such as placement width requirements, maximum left/right diffusion distances, etc., are also disclosed. Example algorithms and process flows related to the above placement methodologies are provided in the following sections.

With reference first to FIGS. 1A-B, some conventional aspects of logic cell placements will be discussed. In FIG. 1A, a top schematic view of layout 100 is shown with two cells, cells 102a-b. Diffusions 106a-b of respective cells 102a-b are shown, along with several polysilicon (poly) layers generally designated by the reference numeral 104. In layout 100, diffusions 106a-b may be inset from left and right edges respectively of corresponding cells 106a-b by poly layers 104 (the inset distance may be a pre-specified value, such as one half of a ground-rule space from the edges of the respective cells). In this arrangement, the length of diffusions 106a-b is bounded on the respective left and right cell edges by poly layers 104. If poly layers 104 on these edges is left floating (i.e., not connected to a ground terminal or supply voltage such as VSS/VDD) then the lengths of diffusions 106a-b stop at the boundaries marked by poly layers 104. In some cases, diffusions 106a-b may be extended to the respective cell edges by tying off poly layers 104 to the same potential as respective diffusions 106a-b (also referred to as gate tie-off); however, this leads to the possibility of short circuits or leakage currents with adjacent cells if there are potential mismatches (e.g., diffusions 106a-b of cells 102a-b may be at different potentials, such as VDD and ground, respectively).

In FIG. 1B, layout 150 is shown, where diffusion cuts 108 are used to extend diffusions 106a-b towards respective cell edges. In a diffusion cut, the diffusion layers are electrically isolated (e.g., cut away or removed), which means that cells 102a-b can abut even if diffusions 106a-b are at different potentials; however, the lengths of diffusions 106a-b are limited and bounded by the diffusion cuts 108, thereby reducing LOD.

In exemplary aspects, the above drawbacks of conventional designs are avoided by minimizing the use of diffusion cuts, gate tie-offs, etc., but extending diffusion regions using exemplary algorithms which will be described with reference to FIGS. 2A-B and 3A-B for some example scenarios.

Figure 2A:
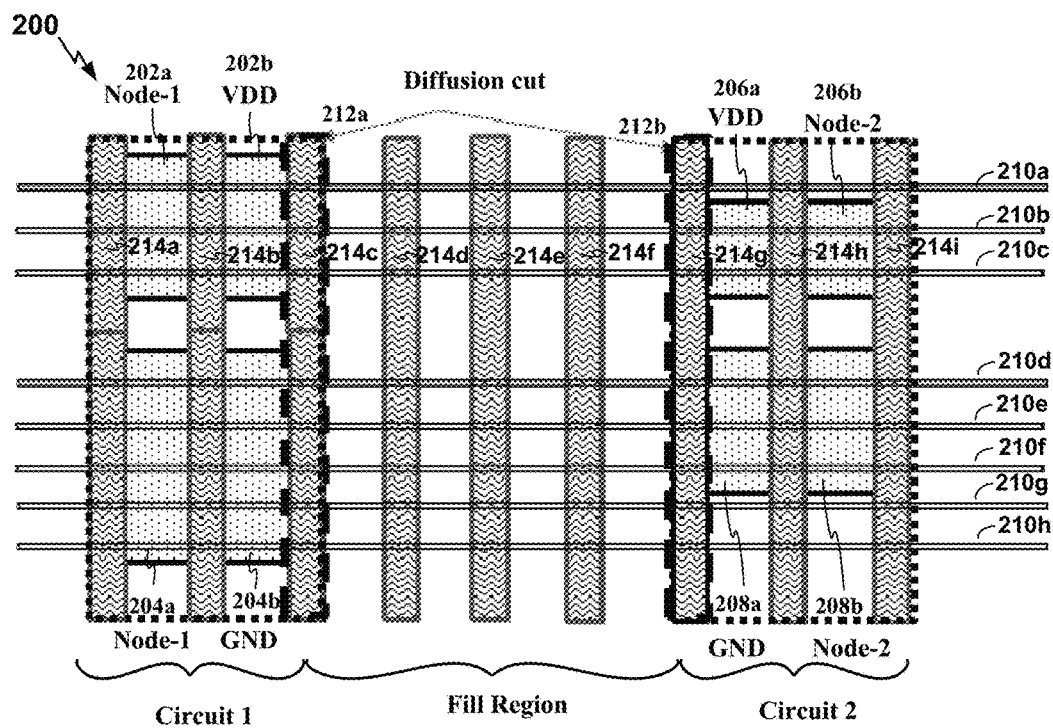
FIGS. 2A-B illustrate transistor level layouts related to exemplary cell placement methodologies of this disclosure.
Figure 2B:
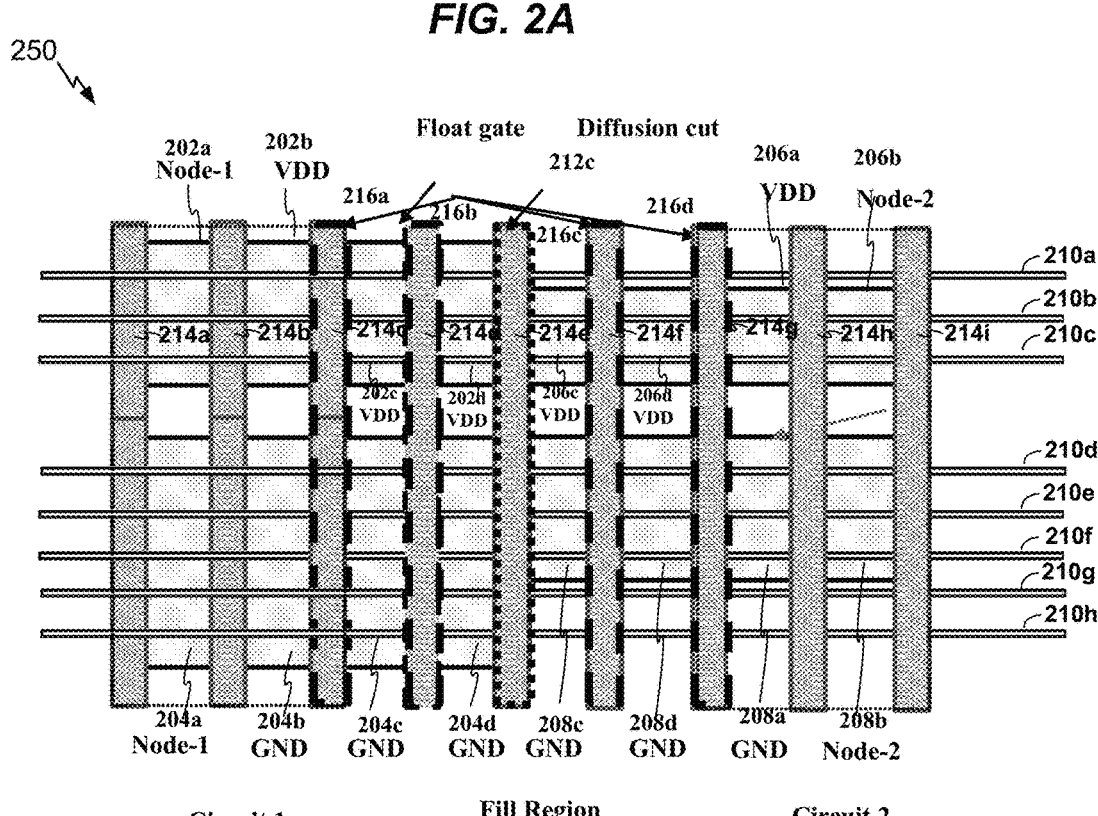

Referring to FIGS. 2A-B, layout 200 represents a starting point from which layout 250 is achieved by exemplary techniques. Accordingly, with reference to FIG. 2A, layout 200 illustrates a top schematic view of the layouts for circuits 1 and 2 which are separated by a fill region. Circuits 1 and 2 may each comprise a p-channel FET (or pfet) and an n-channel FET (or nfet), but of different Fin counts, as will be described in further detail. Circuits 1 and 2 may be separated by a fill region as shown, which may provide various options for improving LOD of underlying diffusion regions of circuits 1 and 2. In layout, horizontal lines identified as 210a-h represent possible regions for placement of Fins. Vertical lines identified as 214a-i represent possible regions for placement of polysilicon layers (poly). Finfets, e.g., pfets and nfets, are formed over corresponding p-type and n-type diffusion regions where a poly acts as a gate (i.e., is connected to a gate potential) and one or more Fins intersect the poly.

For example, a 3-Fin pfet of circuit 1 is realized at p-type diffusion 202a connected to node-1 (which may be any pre-specified potential) to form a drain terminal and p-type diffusion 202b connected to VDD to form a source terminal, with poly 214b acting as a gate terminal connected to a gate potential and three Fins realized at lines 210a, 210b, and 210c. Similarly, a 2-Fin pfet of circuit 2 is realized at p-type diffusion 206a connected to VDD, to form a source terminal, p-type diffusion 206b connected to node-2 (which may be any pre-specified potential) to form a drain terminal, with poly 214h acting as a gate terminal connected to a gate potential and two Fins realized at lines 210b and 210c. Layout 200 illustrates the effect of diffusion cuts 212a and 212b which limit underlying lengths of diffusions 202b and 206a. If diffusion cuts 212a and 212b were not present, it may be possible to extend the lengths of respective diffusions 202b and 206a into the fill region (which may be an empty space, e.g., separated by n=4 poly pitches between poly 214c and 214g in the illustrated example, wherein there are no cells present in the fill region as a starting point for exemplary methodologies).

The nfets of circuits 1 and 2 will now be described. A 5-Fin nfet of circuit 1 is realized at n-type diffusion 204a connected to node-1 (which may be any pre-specified potential) to form a drain terminal and n-type diffusion 204b connected to ground (GND) to form a drain terminal, with poly 214b acting as a gate terminal connected to a gate potential and five Fins realized at lines 210d-h. Similarly, a 3-Fin nfet of circuit 2 is realized at n-type diffusion 208a connected to GND, to form a source terminal, n-type diffusion 208b connected to node-2 (which may be any pre-specified potential) to form a source terminal, with poly 214h acting as a gate terminal connected to a gate potential and three Fins realized at lines 210d-f. Layout 200 once again illustrates the effect of diffusion cuts 212a and 212b which limit underlying lengths of diffusions 204b and 208a. If diffusion cuts 212a and 212b were not present, it may be possible to extend the lengths of respective diffusions 204b and 208a into the fill region.

It is noted that due to the different Fin counts of the respective pfets and nfets of circuits 1 and 2, direct abutment may not be possible in conventional layout techniques. In the following description of layout 250 with reference to FIG. 2B, methodologies are described for filling diffusion regions for filler cells in the fill region, to extend the underlying diffusions of the respective pfets and nfets of circuits 1 and 2 by converting diffusion cuts 212a-b to continuous diffusions; and providing an ability to mate or abut cells which share a common node (e.g., power or VDD/GND) and have a common device size (e.g., channel length, as provided by widths of polysilicon layers) on both the pfet and nfet. In some aspects, extending the diffusions in this manner can also be made consistent with any existing design rules or specifications for maximum left/right diffusion lengths (also referred to as sa/sb values, respectively, in the art). The terms "sa" and "sb," as used herein, refer to parameters associated with a device model of the FinFET that are related LOD effects. Those having skill in the art will readily understand how to adapt the teachings of the present disclosure to the process node at which they are working, based on the presence of analogous parameters in the device model for that process.

Referring to FIG. 2B, layout 250 is illustrated, which may be reached by starting from layout 200 of FIG. 2A and making additions and modifications, e.g., by exemplary placement methodologies or algorithms Diffusion cuts 212a and 212b of layout 200 are replaced by float gates 216a and 216d, respectively, in layout 250. Float gates such as 216a and 216d are created by allowing corresponding poly 214c and 214g to float (i.e., remain unconnected or isolated from electrical connections to power (VDD), ground (GND), etc.). Thus, underlying diffusion regions 202b, 204b of circuit 1 and 206a, 208a of circuit 2 are no longer terminated by diffusion cuts 212a and 212b respectively, but are allowed to extend as follows.

Focusing on the pfets of circuits 1 and 2, it is recognized that the 2-Fin pfet of circuit 2 has lower drive strength than the 3-Fin pfet of circuit 1, since drive strength increases with Fin count. Drive strength can also be increased by increasing the underlying diffusion regions of Finfets as LOD effects are reduced. For the same diffusion length, the LOD effects on transistors with fewer Fins may be worse than the LOD effects on transistors with more Fins. Thus, to minimize the adverse effects of LOD, exemplary methodologies for adding diffusion regions to mate Finfets of disparate Fin counts start with the Finfets of lower Fin counts. Accordingly, starting with the 2-Fin pfet of circuit 2, diffusion region 206d is added to extend diffusion 206a of the 2-Fin pfet. Diffusion 206d is also connected to the same potential (VDD) as diffusion 206a, and because poly 214g is configured as a float gate 216d in layout 250, diffusion 206a can extend in length through diffusion 206d, thus increasing the diffusion length of diffusion 206a. It is noted that if the potentials of drain and source diffusions (e.g., diffusions 206a and 206b of the 2-Fin pfet of circuit 2 are different, with the potential of one of the diffusions (e.g., 206a) not being VDD but for example a different voltage and the other diffusion being a different signal value (e.g., node-2), it is also possible to tie poly 214g to VDD to achieve the effect of extending the diffusion length of diffusion 206a through 206d in some aspects, but gate tie-offs in this manner can possibly lead to unintentional leakages and short-circuits in some cases, so such techniques may be used with caution. Furthermore, a gate cut may also need to be introduced to break the gate connection common to both the pfet and nfet, as will be discussed with reference to FIGS. 3A-B below.

Since the fill region has more room for diffusion length fills such as 206d discussed above, the same technique is extended through one more poly pitch by also filling diffusion 206c connected to the same potential (VDD) and creating float gate 216c from poly 214f, thus extending the diffusion length of 206a even further, through diffusions 206d and 206c towards circuit 1. The corresponding length extension by two poly pitches may provide desired performance improvement and improve LOD on the left side of the 2-Fin pfet of circuit 2, while also satisfying maximum length (sa) specifications.

Accordingly, with reference now to circuit 1, the diffusion length of diffusion 202b on the right side (sb) of the 3-Fin pfet of circuit 1 may also be similarly extended by two poly pitches by filling diffusions 202c and 202d, connecting them to the same potential (VDD) as diffusion 202b, and forming float gates 216a and 216b from poly 214c and 214d, respectively. The two poly pitch extension of diffusion 202b may also be sufficient to achieve desired performance and LOD improvements for the 3-Fin pfet of circuit 1, while also satisfying maximum length (sb) specifications.

To separate the diffusions of the 3-Fin pfet of circuit 1 and the 2-Fin pfet of circuit 2, diffusion cut 212c may be placed on poly 214e. This diffusion cut may be an RX cut (or "RC") or a first cut (or "FC"). In some cases, when desired diffusion length is achieved, a first cut may also be placed in a diffusion region, by placing a similar cut directly on the diffusion region, rather than on an edge marked by a poly layer as in the case of a diffusion cut. Various other techniques for separating the diffusions of circuits 1 and 2, and/or terminating the diffusions of circuits 1 and 2 are also possible within the scope of this disclosure. In the example shown, the same diffusion cut 212c will also be applicable to separate the nfets of circuits 1 and 2, which will now be described in further detail.

Similar to the diffusion length extensions for the pfets, the 5-Fin nfet and the 3-Fin nfet of circuits 1 and 2, respectively, are also extended. The same float gates 216a-d and diffusion cut 212c discussed above for the pfets will also be applicable for the nfets in layout 250. This is because like terminals of nfets and pfets in each of circuits 1 and 2 are connected between the same nodes, i.e., (VDD, node-1, GND) for circuit 1 and (VDD, node-2, GND) for circuit 2. Thus, a similar fill methodology is applied to the nfets, wherein without regard to the order of the fills (since the same float gates 216a-d and diffusion cut 212c discussed above for the pfets will also be applicable for the nfets): diffusion 204b of the 5-Fin nfet of circuit 1 is extended by diffusions 204c and 204d, also connected to the same potential (GND) as 204b, through float gates 216a and 216b, respectively (to meet the desired performance and LOD improvements while being mindful of any existing sb specifications); and diffusion 208a of the 3-Fin nfet of circuit 1 is extended by diffusions 208d and 208c, also connected to the same potential (GND) as 208a, through float gates 216d and 216c, respectively (to meet the desired performance and LOD improvements while being mindful of any existing sa specifications). For both circuits 1 and 2, following the diffusion fills as above, vias (not shown) may be added to complete appropriate power/ground rail connections.

Figure 3A:
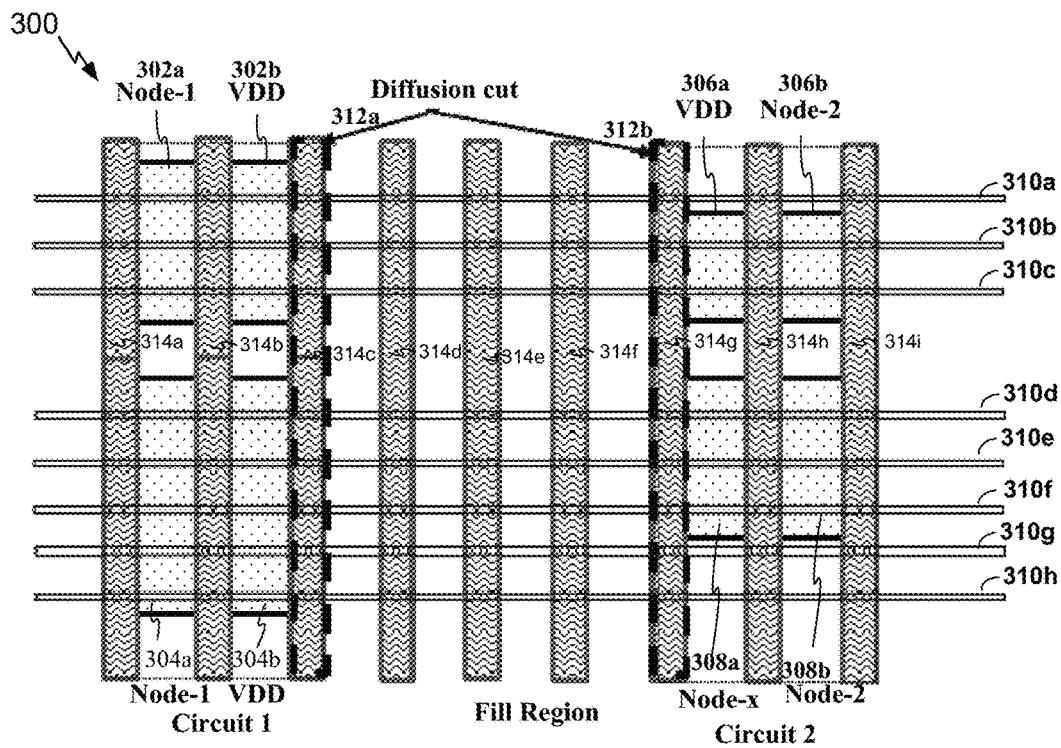
FIGS. 3A-B illustrate transistor level layouts related to exemplary cell placement methodologies of this disclosure.
Figure 3B:
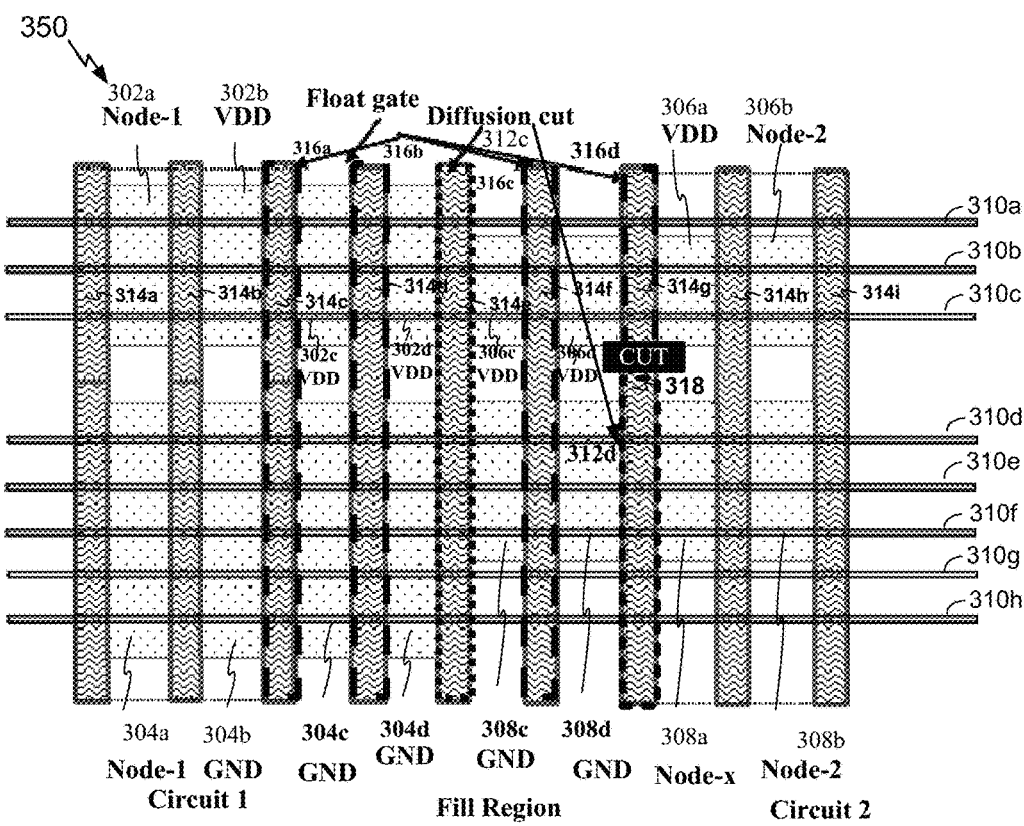

Referring now to FIGS. 3A-B, exemplary placement methodologies are described with reference to layouts 300 and 350, respectively. In many aspects, placement methodologies are similar for FIGS. 3A-B to the aspects for FIGS. 2A-B, and similar reference numerals have been used to indicate the similarities. For example, considering layout 300 as the starting point, similar to layout 200, circuits 1 and 2 have been shown separated by a fill region, with Fin lines 310a-h for possible Fins and poly layers 314a-i for forming possible poly (gate) connections. Accordingly, circuit 1 also includes a 3-Fin pfet with Fins formed at Fin lines 310a-c and gate terminal at poly 314b and a 5-Fin nfet with Fins formed at Fin lines 310d-h and gate terminal at poly 314b; and circuit 2 also has a 2-Fin pfet with Fins formed at Fin lines 310b-c and gate terminal at poly 314h and a 3-Fin nfet with Fins formed at Fin lines 310d-f and gate terminal at poly 314h.

Unlike layout 200, however, in layout 300, the diffusion regions of circuits 1 and 2 are not connected to the same terminals. In more detail, circuit 1 is connected between terminals (VDD, node-1, and GND) with diffusion 302b connected to VDD, diffusions 302a and 304a connected to node-1 and diffusion 304b connected to GND. On the other hand, circuit 2 is connected between (VDD, node-2, and node-x) with diffusion 306a connected to VDD, diffusions 306b and 308b connected to node-2 and diffusion 308a connected to node-x (which can be a potential which is different from GND). Thus, in this case, adding diffusion fills (e.g., connected to GND) may not be possible to extend diffusion 308a of the 3-Fin nfet of circuit 2 connected to node-x; while on the other hand, for the remaining Finfets including the 2-Fin pfet of circuit 2, diffusion extension may be possible in similar manner as described above in FIGS. 2A-B. Accordingly, cut 318 is introduced in FIG. 3B to separate poly 314g into float gate 316d and diffusion cut 312d, as will be described in further detail below.

Once again, starting from layout 300 of FIG. 3A, layout 350 of FIG. 3B is achieved by exemplary placement methodologies. Without an exhaustive repetition of similar aspects of FIGS. 2A-B, for the sake of brevity, it is noted that diffusion 306a of the 2-Fin pfet of circuit 2 is extended by filling diffusions 306d and 306c connected to the same potential (VDD) as diffusion 306a, through float gates 316d (discussed further below) and 316c, respectively; and diffusion 302b of the 3-Fin pfet of circuit 1 is extended by filling diffusions 302c and 302d connected to the same potential (VDD) as diffusion 302b, through float gates 316a and 316b, respectively. The diffusions of the 3-Fin pfet of circuit 1 and the 2-Fin pfet of circuit 2 are separated by diffusion cut 312c placed on poly 314e.

Diffusion 304b of the 5-Fin nfet of circuit 1 is also extended similarly by filling diffusions 304c and 304d connected to the same potential (GND) as diffusion 304b, towards the same diffusion cut 312c.

However, since diffusion 308a of the 3-Fin nfet of circuit 2 is connected to a different potential node-x, diffusion 308a may not be extendable in the same manner as for layout 250 of FIG. 2B. Therefore in layout 350, diffusion cut 312b may be placed, terminating the diffusion length of diffusion 308a connected to node-x, and separating diffusion 308a from diffusions 308d and 308c filled in the fill region and connected to GND. Thus, the same poly 314g is used to support float gate 316d as well as for diffusion cut 312d in this aspect. To enable this dual function, cut 318 is placed on poly 314g, which electrically and physically isolates poly 314g into two parts, one to support float gate 316d and another to support diffusion cut 312d.

In exemplary aspects described above, various cells may be placed to the left of circuit 1 and/or to the right of circuit 2, and similar placement techniques may be extended to add filler cells (or diffusions).

In some aspects, the various poly layers (e.g., formed at 214a-i/314a-i) can be of different widths, to support different channel lengths of the underlying devices (pfets/nfets) which use the poly layers as gate terminals. For example, circuit 1 may be of a different channel length than circuit 2 (e.g., poly 214b/314b may be of a different width than poly 214h/314h).

Furthermore, in some aspects, circuits with different implantations or corresponding threshold voltages may be abutted. For example, circuit 1 may have implantations of corresponding diffusions to support high threshold voltage, whereas circuit 2 may support low threshold voltage in FIGS. 2A-B and/or 3A-B.

In cases where placement separation between laterally placed cells (e.g., of circuits 1 and 2 in the starting point layouts 200 and 300) and fill cells (e.g., diffusions in the fill regions in layouts 250 and 350) are specified or desired, exemplary algorithms may first fill diffusions in the fill regions as discussed with reference to FIGS. 2-3 above to cover remaining fill regions with diffusion cells. Subsequently, for the regions where placement separation is specified, the following placement methodologies may be applied. In one aspect, the device size (Fin count) of filler cells may be matched to the mated edge (e.g., right/left edges of circuits 1 and 2 in FIGS. 2-3) to provide uniform diffusion widths. If a power (VDD) or ground (GND) node is present on these edges, a float gate (e.g., similar to 216a/316a) may be provided, or in some cases, a gate tie-off of a poly at the edge may also be employed. In one aspect, filler cells may be placed taking into account both left and right cell placement specifications that may exist between the filler cells/diffusions. In some aspects, unique filler cells may be provided to meet specifications. The filler cells may be inserted between two distinct cells placed within a placement row, with left and right edges of the filler cells designed to match Fin counts of edges of circuits that the filler cells abut. In some aspects, a diffusion cut (or RX cut or first cut) may be placed in the diffusions of the filler cells to meet maximum sa, sb specifications, wherein the location of the cuts may be determined in a manner which improves performance, while starting with devices with smaller Fin counts, or any other specifications/special markers. The filler cells with a cut (e.g., RX cut or first cut) may support different Fin counts of circuit cells (e.g., pfets/nfets) placed on left and right edges of the filler cells. The filler cells may provide via redundancy to the power (VDD) and/or ground (GND) rails on shared edge interfaces with circuit cells. In some aspects, given or standard filler cells may be mirror-flipped (laterally and horizontally flipped in the top views shown in FIGS. 2-3) in-place, to allow shared common sized devices with power (VDD) and/or ground (GND) rails to abut directly, in an effort to also minimize the use of filler cells in a layout. In some aspects, filler cells may be placed with effectively no or zero placement width (e.g., no additional poly pitches) to support circuit cells on layouts which have no fill region between them. For example, if a first transistor abuts a second transistor in a transistor layout, then a fill region may be added by introducing a space of zero width between the first and second transistors if the first and second transistors are Finfets with equal number of Fins.

In some aspects it is also possible to transfer or convey information regarding the effective diffusion lengths (e.g., effective sa, sb values after diffusion regions are added according to aspects described above), to the timing analysis tools. The timing analysis tools may be used for predicting or analyzing timing of circuits placed, and with improved diffusion lengths and correspondingly improved performance, the timing analysis tools may associate lower or better timing metrics with circuit cells which have their LOD improved.

In some aspects, placement methodologies may be designed to introduce spaces between cells which share the same potential for diffusion regions but do not share common device sizes or Fin counts (e.g., a fill region may be introduced, if not already present as shown between pfets of circuits 1 and 2 in FIGS. 2-3). In such cases, the above aspects of adding diffusions for filler cells while taking into account any maximum sa, sb specifications, using mirror-flips to allow shared common sized devices with power (VDD) and/or ground (GND) rails to abut directly to minimize the use of filler cells, etc., may be employed even if the starting point does not already have a fill region as previously discussed.

Figure 4:
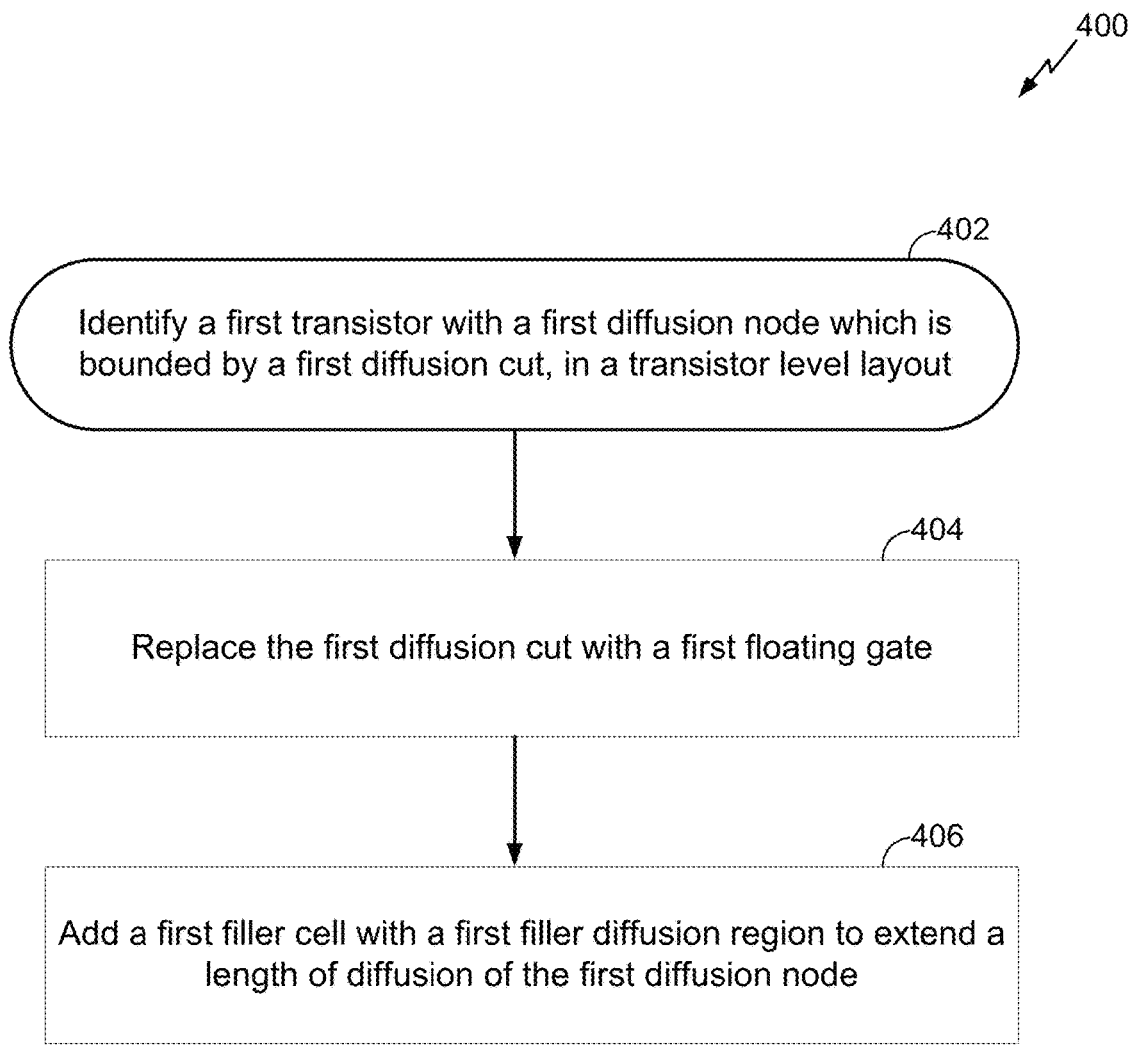
FIG. 4 illustrates a flow chart of a cell placement method according to this disclosure.

Accordingly, it will be appreciated that aspects include various methods for performing the processes, functions and/or algorithms disclosed herein. For example, as illustrated in FIG. 4, an aspect can include method 400 of logic cell placement, as follows.

In Block 402, method 400 comprises identifying a first transistor (e.g., 3-Fin pfet of circuit 1 in FIG. 2A) with a first diffusion node (e.g., diffusion 202b) which is bounded by a first diffusion cut (e.g., diffusion cut 212a) in a transistor level layout (e.g., layout 200 of FIG. 2A).

Block 404 comprises replacing the first diffusion cut with a first floating gate (e.g., float gate 216a in FIG. 2B).

Block 406 comprises adding a first filler cell with a first filler diffusion region (e.g., 202c in FIG. 2B) to extend a length of diffusion of the first diffusion node. As discussed above, increasing the length of diffusion leads to improving drive strength and performance of the first transistor in some aspects. In some aspects, the first diffusion node is on a left side (e.g., 202a) or a right side (e.g., 202b) of the first transistor, and wherein extending the length of diffusion of the first diffusion node satisfies corresponding maximum length specifications for the left side (e.g., sa) or the right side (e.g., sb), respectively, of the first transistor. The first diffusion node (e.g., 202a) and the first filler diffusion region (e.g., 202c) are connected to a same potential (e.g., VDD, or in some cases (e.g., in the case of diffusion node 204b of the 5-Fin nfet of circuit 1 and the filler diffusion region 204c, the same potential may be ground (GND)). Further, the first transistor and the first filler cell may have a same device channel length (e.g., same thickness of shared poly 214c) or same threshold voltage or implantation.

As shown in FIGS. 2-3, for example, the first transistor may be a Finfet with a number of one or more Fins (e.g., 3-Fin pfet of circuit 1), with a first width of the first diffusion node (e.g., width of diffusion 202b) proportional to the number of Fins, and wherein a width of the first filler diffusion region (e.g., width of diffusion 202c) matches the first width. Although not shown in FIG. 4, as previously explained, in some aspects, method 400 can further comprise placing a first cut in the first filler diffusion region node (e.g., a first cut in 202c) to satisfy a maximum length specification (e.g., sb) for the first diffusion node. In some cases, the first cut (e.g., 212c) may also be placed at an interface between the first filler diffusion region (e.g., 202d) and a second diffusion region (e.g., 206c, which may also be a filler diffusion region in some cases), wherein a width of the second diffusion region (e.g., corresponding to 2-Fins of 206c) is different from the width of the first filler diffusion region (e.g., corresponding to 3-Fins of 202d). Further, the first filler cell may be added in a fill region (e.g., as shown in FIGS. 2-3) between the first transistor (e.g., 3-Fin pfet of the first circuit) and a second transistor (e.g., 2-Fin pfet of the second circuit) in the transistor level layout, wherein the first transistor (e.g., 3-Fin pfet) and second transistor (e.g., 2-Fin pfet) are both Finfets with corresponding first and second numbers of one or more Fins (e.g., 3-Fins and 2-Fins, respectively). As previously explained, if the fill region is not already present, e.g., if the first transistor abuts the second transistor in the transistor layout, a fill region may be introducing by adding a space between the first and second transistors in the transistor level layout and adding the first filler cell in the fill region. However, in some cases, the space may be of zero width, e.g., if the first and second transistors are Finfets with equal number of Fins.

Further, although not shown in FIG. 4, in some aspects, the first filler cell may be created from a unique cell in a library or based on manipulations such as mirror-flipping a transistor layout of an existing cell in a logic cell library. In some aspects, a second diffusion region of a second transistor (e.g., 3-Fin nfet of circuit 2 in FIGS. 3A-B) in the transistor level layout (e.g., layouts 300-350) comprises a second diffusion node (e.g., diffusion 308a) connected to a second potential (e.g., node-x) which is different from a third diffusion (e.g., 308d) sharing a common poly silicon layer (e.g., 314h) with the second diffusion, and placing a diffusion cut (e.g., 312d) in the common poly silicon layer. Further, if the common polysilicon layer (e.g., 314h) is also connected to the first floating gate (e.g., 316d), a polysilicon cut or gate cut (e.g., 318) may be placed to disconnect the common polysilicon layer from the first floating gate.

As will be appreciated, exemplary aspects include apparatus comprising various means for performing method 400, e.g., electronic design automation (EDA) tools for designing integrated circuit layouts. Furthermore, aspects also include apparatus such as computer-readable storage media comprising data representing an integrated circuit layout (e.g., layout 200 of FIG. 2A), wherein the integrated circuit layout can comprise: a first transistor (e.g., 3-Fin pfet of circuit 1 in FIG. 2A) with a first diffusion node (e.g., diffusion 202b) which is bounded by a first floating gate (e.g., float gate 216a in FIG. 2B) and a first filler cell comprising a filler diffusion region (e.g., 202c in FIG. 2B) configured to abut the first floating gate and extend a length of diffusion of the first diffusion node. Further, the integrated circuit layout can also include a diffusion cut or first cut in the first filler diffusion region to satisfy a maximum length specification for the first diffusion node (e.g., sa or sb).

Figure 5:
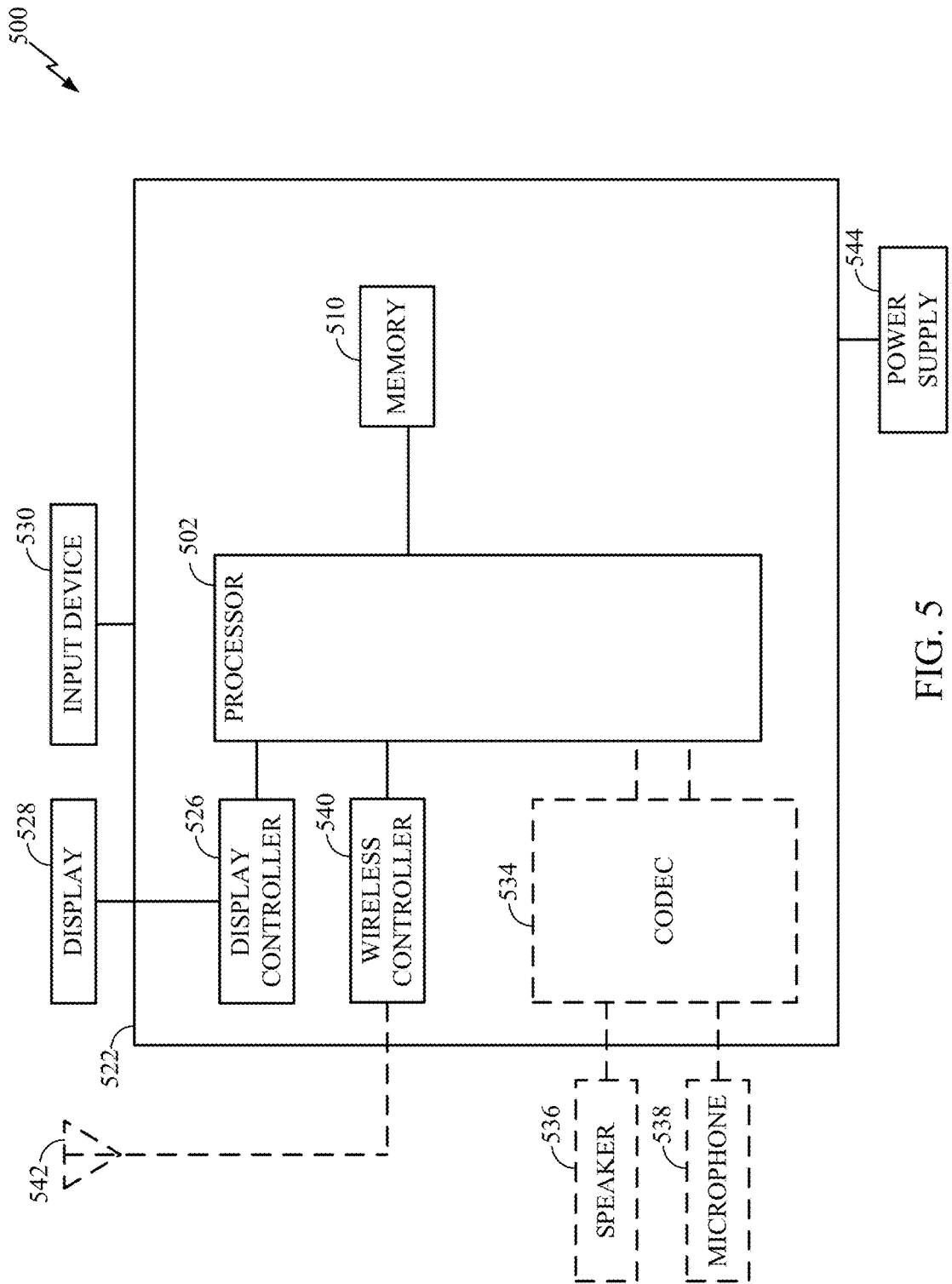
FIG. 5 depicts an exemplary computing device in which an aspect of the disclosure may be advantageously employed.

An example apparatus in which exemplary aspects of this disclosure may be utilized, will now be discussed in relation to FIG. 5. FIG. 5 shows a block diagram of computing device 500. In some aspects, method 400 may be used in the transistor level layout of one or more units of computing device 500.

Computing device 500 is shown to include processor 502 coupled to memory 510. FIG. 5 also shows display controller 526 that is coupled to processor 502 and to display 528. In some cases, computing device 500 may be used for wireless communication and FIG. 5 also shows optional blocks in dashed lines, such as coder/decoder (CODEC) 534 (e.g., an audio and/or voice CODEC) coupled to processor 502 and speaker 536 and microphone 538 coupled to CODEC 534; and wireless antenna 542 coupled to wireless controller 540 which is coupled to processor 502. Where one or more of these optional blocks are present, in a particular aspect, processor 502, display controller 526, cache 504, cache controller 506, memory 510, and wireless controller 540 are included in a system-in-package or system-on-chip device 522.

Accordingly, a particular aspect, input device 530 and power supply 544 are coupled to the system-on-chip device 522. Moreover, in a particular aspect, as illustrated in FIG. 5, where one or more optional blocks are present, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 generally depicts a computing device, processor 502 and memory 510, may also be integrated into a set top box, a music player, a video player, an entertainment unit, a navigation device, a personal digital assistant (PDA), a fixed location data unit, a computer, a laptop, a tablet, a communications device, a mobile phone, a server, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for reducing length-of-diffusion (LOD) effect in logic cell layouts. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of logic cell placement, the method implemented by a computer, the method comprising:
   identifying a first transistor with a first diffusion node which is bounded by a first diffusion cut;
   replacing the first diffusion cut with a first floating gate; and
   adding a first filler cell with a first filler diffusion region to extend a length of diffusion of the first diffusion node.

2. The method of claim 1, wherein increasing the length of diffusion comprises improving drive strength of the first transistor.

3. The method of claim 1, wherein the first diffusion node is on a left side or a right side of the first transistor, and wherein extending the length of diffusion of the first diffusion node satisfies corresponding maximum length specifications for the left side or the right side, respectively, of the first transistor.

4. The method of claim 1, comprising placing a first cut in the first filler diffusion region to satisfy a maximum length specification for the first diffusion node.

5. The method of claim 1, wherein the first transistor is a Fin field effect transistor (Finfet) with a number of Fins, with a first width of the first diffusion node proportional to the number of Fins, and wherein a width of the first filler diffusion region matches the first width.

6. The method of claim 5, comprising placing a first cut at an interface between the first filler diffusion region and a second diffusion region, wherein a width of the second diffusion region is different from the width of the first filler diffusion region.

7. The method of claim 1, comprising adding the first filler cell in a fill region between the first transistor and a second transistor.

8. The method of claim 7, wherein the first transistor and the second transistor are both Fin field effect transistors (Finfets) with corresponding first and second numbers of Fins.

9. The method of claim 1, wherein if the first transistor abuts a second transistor, adding a fill region by introducing a space between the first and second transistors and adding the first filler cell in the fill region.

10. The method of claim 9, wherein the space is of zero width if the first and second transistors are Fin field effect transistors (Finfets) with equal number of Fins.

11. The method of claim 1, wherein the first diffusion node and the first filler diffusion region are connected to a same potential.

12. The method of claim 11, wherein the same potential corresponds to a supply voltage or ground.

13. The method of claim 1, wherein the first transistor and the first filler cell have a same device channel length.

14. The method of claim 1, comprising wherein the first transistor and the first filler cell have a same threshold voltage or implantation.

15. The method of claim 1, wherein the first transistor is one of a p-channel field effect transistor (pfet) or an n-channel field effect transistor (nfet).

16. The method of claim 15, wherein the first filler diffusion region comprises a p-type diffusion if the first transistor is a pfet and the first filler diffusion region comprises an n-type diffusion if the first transistor is an nfet.

17. The method of claim 1, comprising creating the first filler cell by mirror-flipping a transistor layout in a logic cell library.

18. The method of claim 1, further comprising determining that a second transistor comprises a second diffusion node connected to a second potential which is different from a potential of a third diffusion node sharing a common polysilicon layer with the second diffusion node, and placing a diffusion cut in the common polysilicon layer.

19. The method of claim 18, wherein the common polysilicon layer is also connected to the first floating gate, and placing a polysilicon cut to disconnect the common polysilicon layer from the first floating gate.

20. An apparatus comprising:
means for identifying a first transistor with a first diffusion node which is bounded by a first diffusion cut;
means for replacing the first diffusion cut with a first floating gate; and
means for adding a first filler cell with a first filler diffusion region to extend a length of diffusion of the first diffusion node.

21. The apparatus of claim 20 comprising means for extending the length of diffusion of the first diffusion node to satisfy maximum length specifications of the first transistor.

22. The apparatus of claim 20, comprising means for placing a first cut in the first filler diffusion region to satisfy a maximum length specification for the first diffusion node.

23. The apparatus of claim 20, wherein the first transistor is a Fin field effect transistor (Finfet) with a number of Fins, with a first width of the first diffusion node proportional to the number of Fins, and wherein a width of the first filler diffusion region matches the first width.

24. The apparatus of claim 23 further comprising means for placing a first cut at an interface between the first filler diffusion region and a second diffusion region, wherein a width of the second diffusion region is different from the width of the first filler diffusion region.

25. The apparatus of claim 20, comprising means for adding the first filler cell in a fill region between the first transistor and a second transistor.

26. An apparatus comprising:
an integrated circuit layout, the integrated circuit layout comprising:
a first transistor with a first diffusion node which is bounded by a first floating gate; and
a first filler cell comprising a first filler diffusion region configured to abut the first floating gate and extend a length of diffusion of the first diffusion node.

27. The apparatus of claim 26, further comprising a diffusion cut or first cut in the first filler diffusion region to satisfy a maximum length specification for the first diffusion node.

28. A non-transitory computer readable storage medium comprising code, which, when executed by a processor, causes the processor to perform a cell placement method, the non-transitory computer readable storage medium comprising:
code for identifying a first transistor with a first diffusion node which is bounded by a first diffusion cut;
code for replacing the first diffusion cut with a first floating gate; and
code for adding a first filler cell with a first filler diffusion region to extend a length of diffusion of the first diffusion node.

29. The non-transitory computer readable storage medium of claim 28 comprising code for extending the length of diffusion of the first diffusion node to satisfy maximum length specifications of the first transistor.

30. The non-transitory computer readable storage medium of claim 29, comprising code for adding the first filler cell in a fill region between the first transistor and a second transistor.

* * * * *